B. A. MORRIS.
PLOW ATTACHMENT.
APPLICATION FILED JAN. 22, 1910.
976,677.
Patented Nov. 22, 1910.
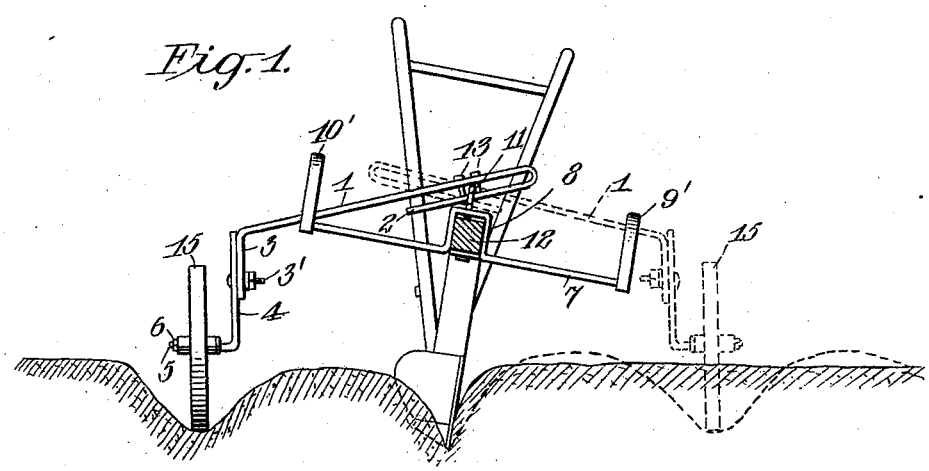
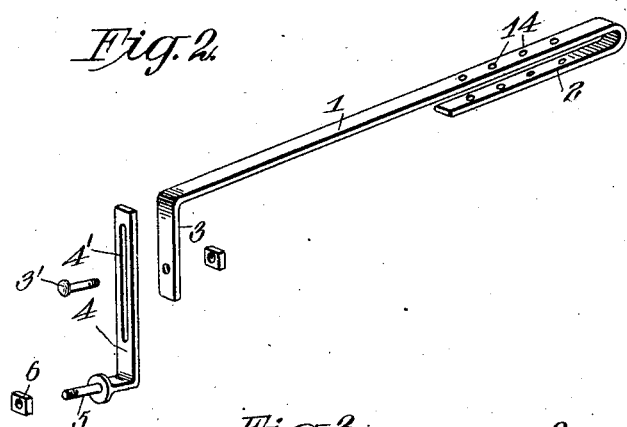
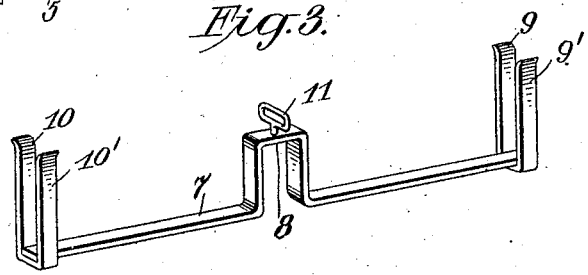
WITNESSES:
Samuel E. Wade
L. A. Stanley
INVENTOR
BOAZ A. MORRIS,
BY Munn & Co.
ATTORNEYS

UNITED STATES PATENT OFFICE.

BOAZ ALBERT MORRIS, OF NEWBERN, NORTH CAROLINA.

PLOW ATTACHMENT.

976,677.  Specification of Letters Patent.  Patented Nov. 22, 1910.

Application filed January 22, 1910. Serial No. 539,486.

*To all whom it may concern:*

Be it known that I, BOAZ ALBERT MORRIS, a citizen of the United States, and a resident of Newbern, in the county of Craven and State of North Carolina, have made certain new and useful Improvements in Plow Attachments, of which the following is a specification.

My invention relates to gage attachments for plows, and it consists in the combinations, constructions and arrangement of parts herein described and claimed.

An object of my invention is to provide a gage which may be attached to a plow to be operated on either side of the plow as required to enable the operator of the plow to make straight or regular rows or furrows.

A further object of my invention is to provide a simple device which may be readily attached to any form of plow and which may be moved from one side to the other with ease.

Other objects and advantages will appear in the following specification, and the novel features of the device will be particularly pointed out in the appended claim.

My invention is illustrated in the accompanying drawings, in which:—

Figure 1 shows a plow with my gage attachment secured thereto: Fig. 2 shows the adjustable gage arm, and Fig. 3 shows the supports for the gage arm.

In carrying out my invention I provide a gage arm like that shown in Fig. 2 consisting of a bar 1 bent back upon itself at 2 at one end, and having a lateral bend 3 at the other end. The latter is provided with a hole 3'. An L-shaped arm 4 is provided with a slot 4' for the reception of the bolt 3' and may be adjustably secured to the bent portion 3. The member 4 bears on axle 5 and collar 5'. The axle is threaded at its ends to receive a nut 6.

The gage arm support consists of a bar 7 having an inverted U-shaped bend 8 at its center and being provided with the upwardly extending arms 9 and $9^1$ at one end and 10 and $10^1$ at the other. In the central portion of the U-shaped bend is an elongated eye 11.

The parts are assembled as shown in Fig. 1. In this figure it will be observed that the U-shaped bend 8 of the arm 7 fits over the plow beam 12, being secured thereto in any suitable manner. The bent portion 2 of the adjustable arm 1 passes through the eye 11 and is held by means of the bolts 13, which are secured each side of the eye in the openings 14 (see Fig. 2). The arm 1 passes between the arms 10 and $10^1$ and is supported on its outer edge by the wheel 15.

From the foregoing description of the various parts of the device the operation thereof may be readily understood. The first furrow is made in the ordinary manner, and the second furrow may be gaged by the attachment by placing the wheel 15 in the first furrow and securing the arm 1 to the eye 11 by means of the bolts 13, in the manner already described. As the plow is drawn forward the wheel 15 is kept in the first furrow, and the result is that the next furrow is parallel to the first one. The third furrow is gaged by the second one and each furrow thereafter is gaged in a similar manner. The wheel 15 may be attached on the other side of the plow, the arm 1 then passing between the arms 9 and $9^1$ as indicated in the dotted lines in Fig. 1. This is accomplished by lifting the bar 1 from the support and turning on the pivoted eye 11 to the support on the other side.

The use of the device described above will insure the proper location of the furrows with very little care on the part of the plowman.

I claim:—

In a gage attachment for plows, a laterally extending arm secured to the plow beam, a pair of upwardly extending arms secured at the extremity of said laterally extending arms, an eye secured to said plow beam, a gage arm having a portion bent back upon itself and arranged to enter said eye, means for adjustably securing said gage arm to said eye, said gage arm being arranged to pass between said upwardly extending arms, and a gage wheel secured to the outer end of said gage arm.

BOAZ ALBERT MORRIS.

Witnesses:
J. A. PATTERSON,
A. J. GASKINS.